United States Patent
Hayashi et al.

(10) Patent No.: US 9,713,177 B2
(45) Date of Patent: Jul. 18, 2017

(54) MANAGEMENT DEVICE, CONTROL DEVICE, AND COMMUNICATION METHOD

(71) Applicant: FUJITSU LIMITED, Kawasaki-shi, Kanagawa (JP)

(72) Inventors: Toshiki Hayashi, Yokohama (JP); Fumihiko Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 14/445,459

(22) Filed: Jul. 29, 2014

(65) Prior Publication Data

US 2015/0043342 A1 Feb. 12, 2015

(30) Foreign Application Priority Data

Aug. 9, 2013 (JP) .................. 2013-166767

(51) Int. Cl.
*H04W 76/02* (2009.01)

(52) U.S. Cl.
CPC .......... *H04W 76/02* (2013.01); *H04W 76/027* (2013.01)

(58) Field of Classification Search
CPC ... H04W 76/02; H04W 76/027; H04W 4/005; H04W 72/121; H04W 28/0289
See application file for complete search history.

(56) References Cited

U.S. PATENT DOCUMENTS

| | | |
|---|---|---|
| 2011/0199905 A1 | 8/2011 | Pinheiro et al. |
| 2012/0017216 A1 | 1/2012 | Chan et al. |
| 2012/0026879 A1* | 2/2012 | Foottit ................ H04L 47/12 370/235 |
| 2012/0155310 A1 | 6/2012 | Kreuzer et al. |
| 2012/0163265 A1* | 6/2012 | Kotecha ............. H04W 74/006 370/312 |
| 2013/0051228 A1 | 2/2013 | Kim et al. |

(Continued)

FOREIGN PATENT DOCUMENTS

| | | |
|---|---|---|
| JP | 09-036964 | 2/1997 |
| JP | 2012-85011 | 4/2012 |
| WO | 2007/108131 A1 | 9/2007 |

OTHER PUBLICATIONS

ZTE, "Device Triggering for Offline MTC Device", 3GPP Draft, S2-112330, SA WG, May 16-20, 2011, Xi'An, P.R. China, XP050525351, retrieved on May 11, 2011.

(Continued)

*Primary Examiner* — Redentor Pasia
*Assistant Examiner* — Peter Mak
(74) *Attorney, Agent, or Firm* — Staas & Halsey LLP

(57) ABSTRACT

A management device includes: an estimator configured to estimate whether or not mobile station devices each requests a wireless connection at a target time after a current time; and an instructor configured to instruct a control device, configured to control calls of the mobile station devices, to execute a process of causing a first mobile station device to request the wireless connection at a first time before the target time and causing a second mobile station device that is different from the first mobile station device to request the wireless connection at a second time that is before the target time and different from the first time, in a case where the number of mobile station devices that are each estimated to request the wireless connection to the control device at the target time exceeds a predetermined value.

7 Claims, 13 Drawing Sheets

(56) References Cited

U.S. PATENT DOCUMENTS

2013/0155994 A1  6/2013  Yoshizawa et al.
2014/0140207 A1* 5/2014  Chen ................ H04W 28/0215
                                                            370/230

OTHER PUBLICATIONS

Extended European Search Report of European Patent Application No. 14180276.9-1854, Feb. 12, 2015.
Japanese Office Action mailed Mar. 14, 2017 in related Japanese Application No. 2013-166767.

* cited by examiner

| TIME | MOBILE STATION | CONTROL DEVICE |
|---|---|---|
| 13:30:12 | UE1 | MME1 |
| 13:30:47 | UE2 | MME2 |
| 13:31:01 | UE3 | MME1 |
| 13:31:09 | UE2 | MME1 |
| 13:31:25 | UE3 | MME1 |
| 13:31:41 | UE1 | MME2 |
| ⋮ | ⋮ | ⋮ |

| MOBILE STATION | ASSOCIATED CONTROL DEVICE |
|---|---|
| UE1 | MME2 |
| UE2 | MME1 |
| UE3 | MME1 |
| UE4 | MME2 |
| UE5 | MME1 |
| ⋮ | ⋮ |

MME1

| TIME | NUMBER Nu OF MOBILE STATIONS |
|---|---|
| 13:30:00 – 13:30:59 | 59 |
| 13:31:00 – 13:31:59 | 1,038 |
| 13:32:00 – 13:32:59 | 152 |
| ⋮ | ⋮ |

MME2

| TIME | NUMBER Nu OF MOBILE STATIONS |
|---|---|
| 13:30:00 – 13:30:59 | 121 |
| 13:31:00 – 13:31:59 | 1,376 |
| 13:32:00 – 13:32:59 | 98 |
| ⋮ | ⋮ |

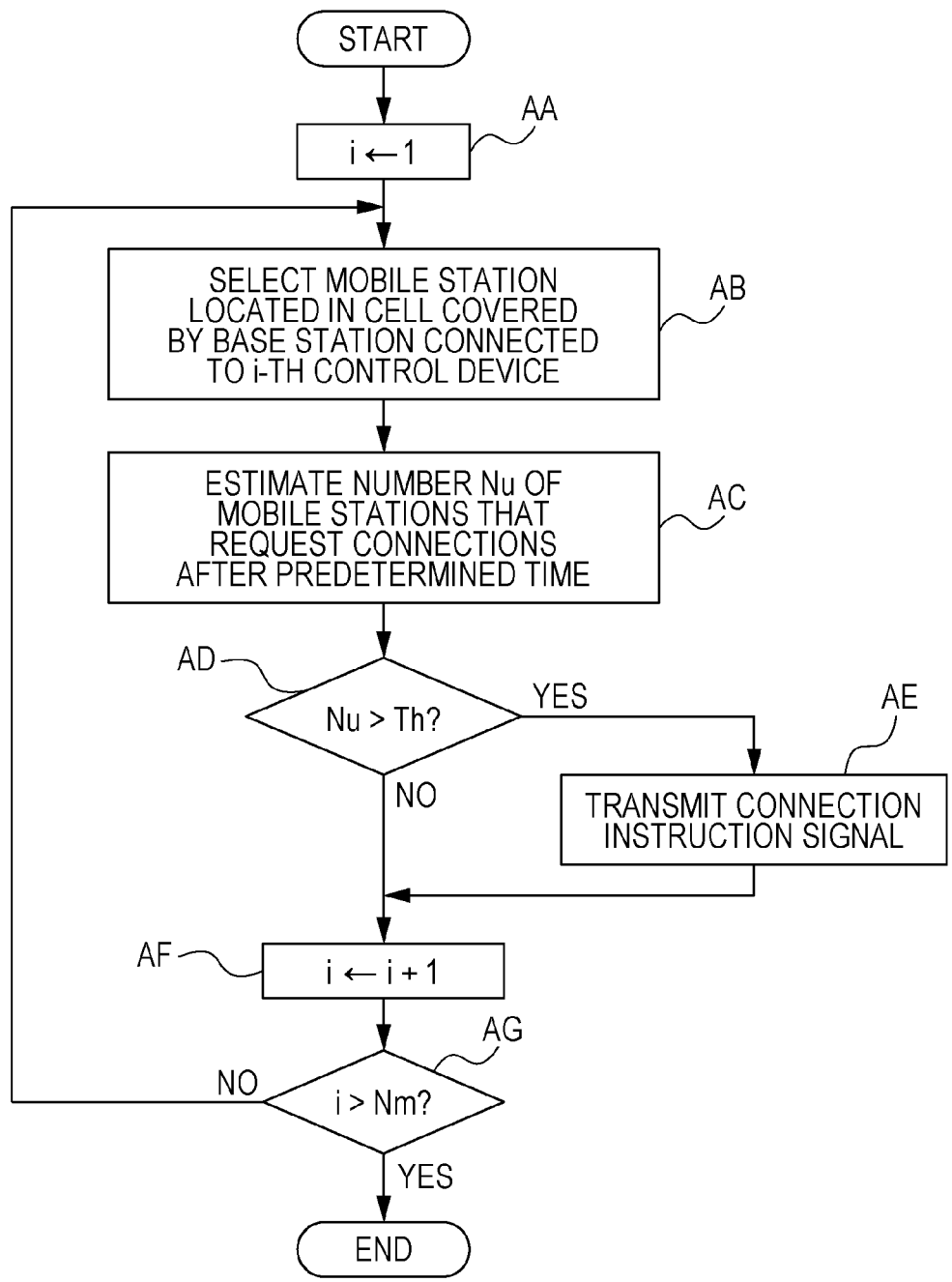

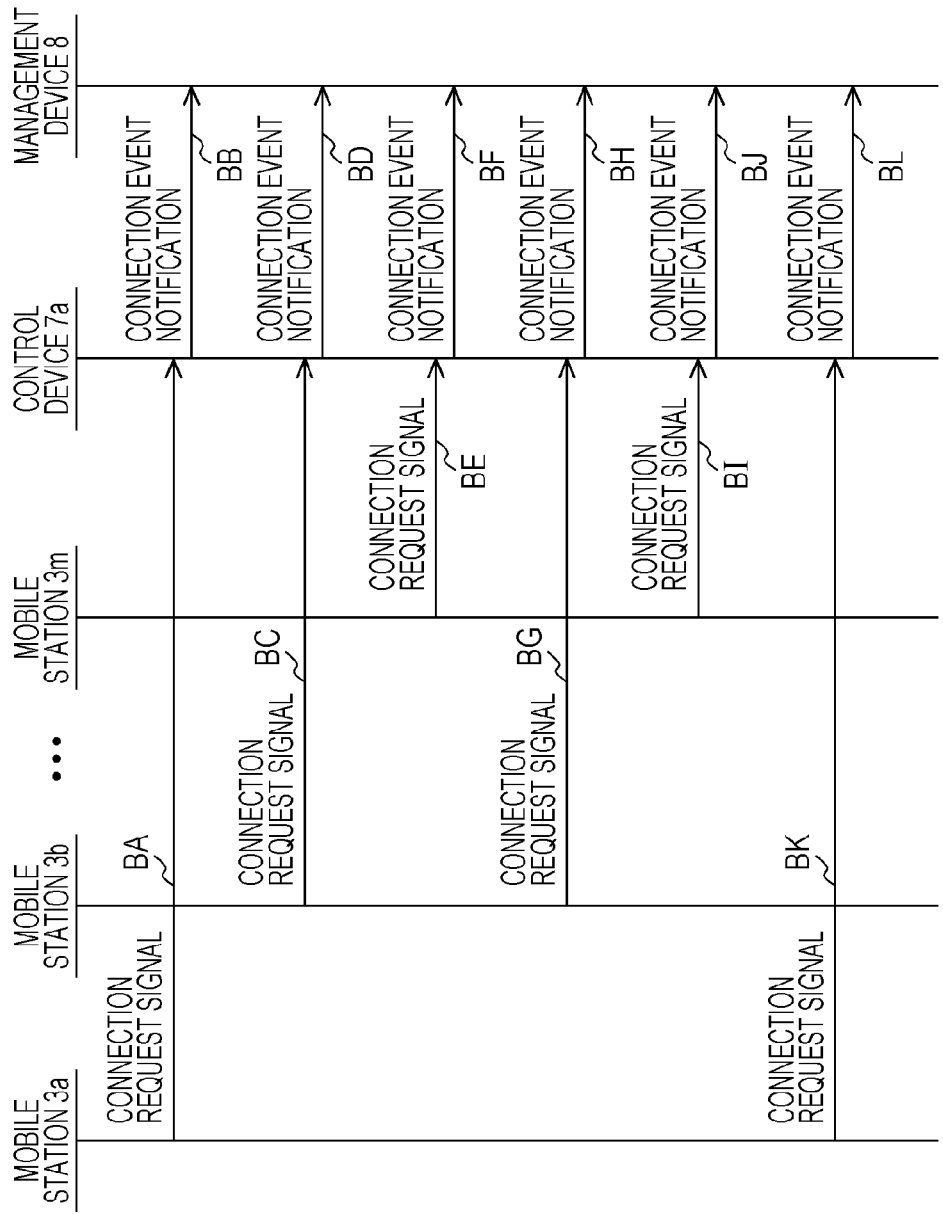

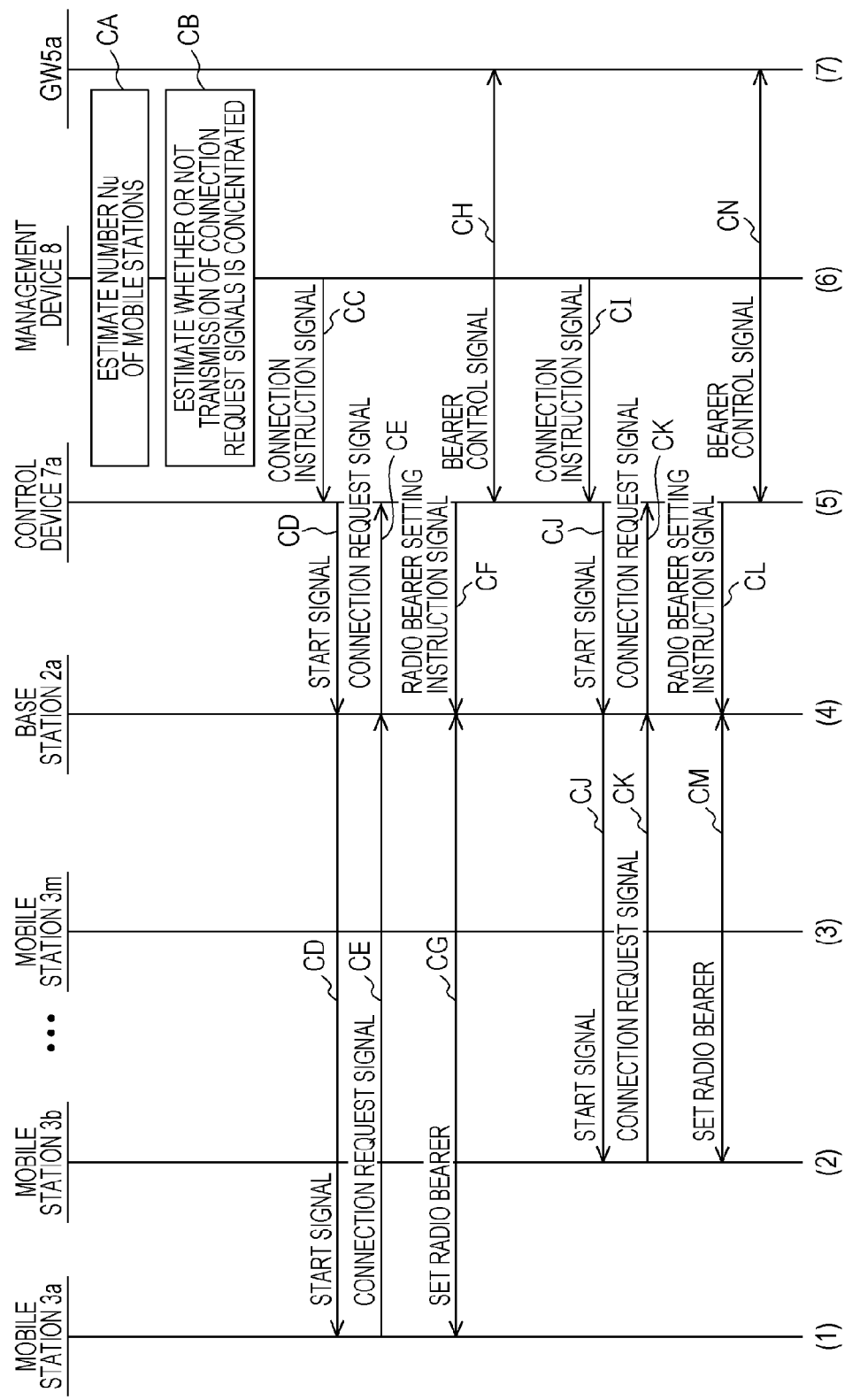

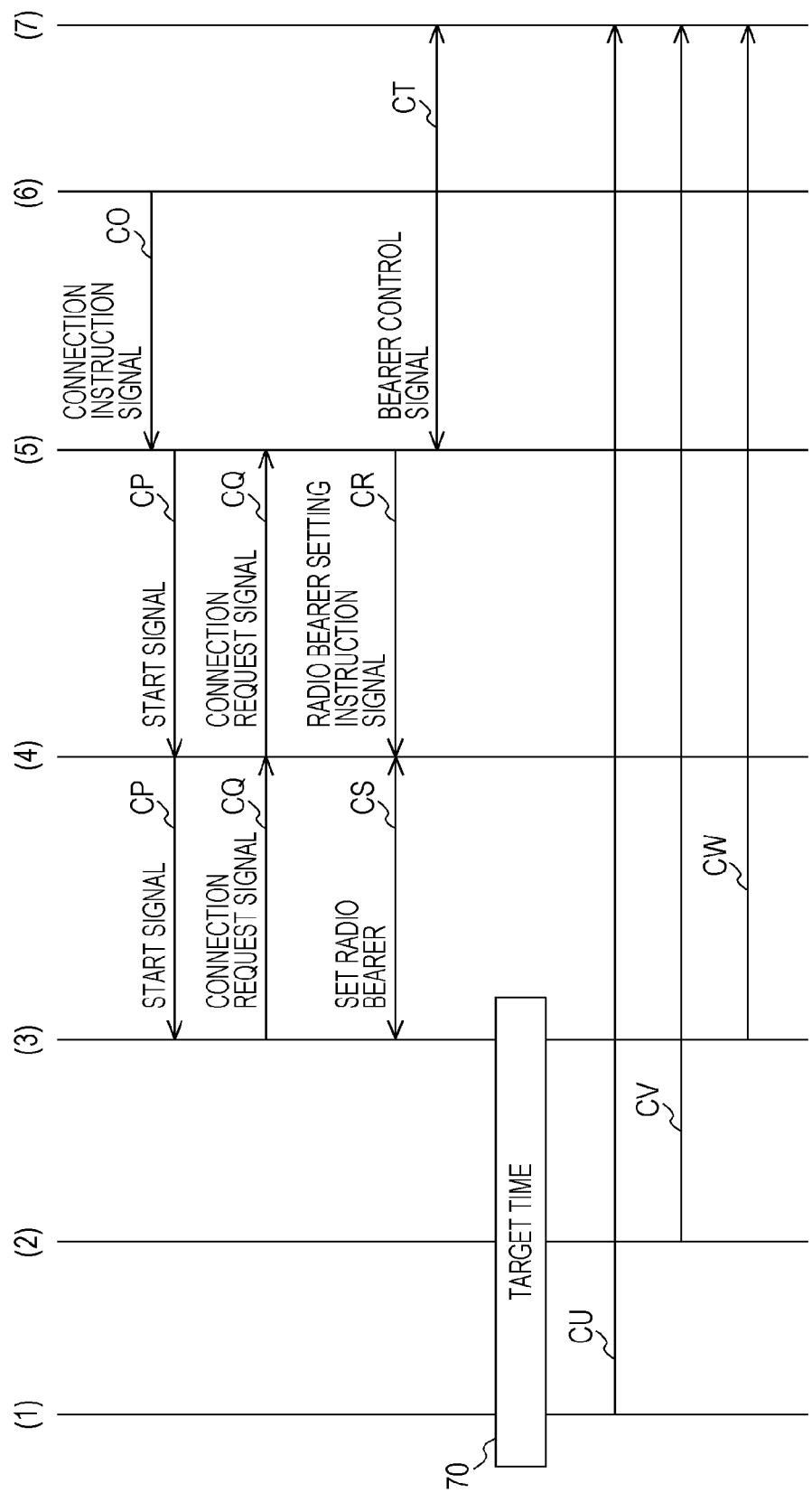

MANAGEMENT DEVICE, CONTROL DEVICE, AND COMMUNICATION METHOD

CROSS-REFERENCE TO RELATED APPLICATION

This application is based upon and claims the benefit of priority of the prior Japanese Patent Application No. 2013-166767, filed on Aug. 9, 2013, the entire contents of which are incorporated herein by reference.

FIELD

The embodiments discussed herein are related to a management device, a control device, and a communication method.

BACKGROUND

A base station device configured to access a network based on a current time exists. For example, an application program that is executed in a smart phone and has a function of accessing a server periodically or at a certain time on each day exists.

As a related technique, a technique is known, which causes a center to receive originating identifications (IDs), connects the center to requesting terminals using a callback method, and sequentially connects requesting terminals grouped for each originating site to each other according to an ID list (refer to, for example, Japanese Laid-open Patent Publication No. 9-36964).

SUMMARY

According to an aspect of the invention, a management device includes: an estimator configured to estimate whether or not mobile station devices each requests a wireless connection at a target time after a current time; and an instructor configured to instruct a control device, configured to control calls of the mobile station devices, to execute a process of causing a first mobile station device to request the wireless connection at a first time before the target time and causing a second mobile station device that is different from the first mobile station device to request the wireless connection at a second time that is before the target time and different from the first time, in a case where the number of mobile station devices that are each estimated to request the wireless connection to the control device at the target time exceeds a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a connection event table;

FIG. 5 is a diagram illustrating an example of an associated control device table;

FIGS. 6A and 6B are diagrams illustrating an example of an estimation table;

FIG. 7 is a diagram illustrating an example of an operation of the management device;

FIG. 8 is a diagram illustrating an example of a connection event notification operation;

FIG. 9 is a diagram illustrating an example of an operation for instructions for connections;

FIG. 10 is a diagram illustrating the example of the operation for the instruction for connections;

DESCRIPTION OF EMBODIMENTS

In order to access a network, a mobile station device transitions from an idle state in which a bearer between the mobile station device and a gateway device included in a fixed communication network is released to an active state in which the bearer is set. When a plurality of mobile station devices simultaneously access the network based on a current time and the access is concentrated on the network for a short time, congestion may occur due to a process executed by a control device for controlling calls of mobile station devices.

Hereinafter, a management device, a control device, and a communication method, which suppress congestion occurred due to a process executed by a control device for executing a call control process of controlling calls of mobile station devices, are described.

First Embodiment

Figure 1:
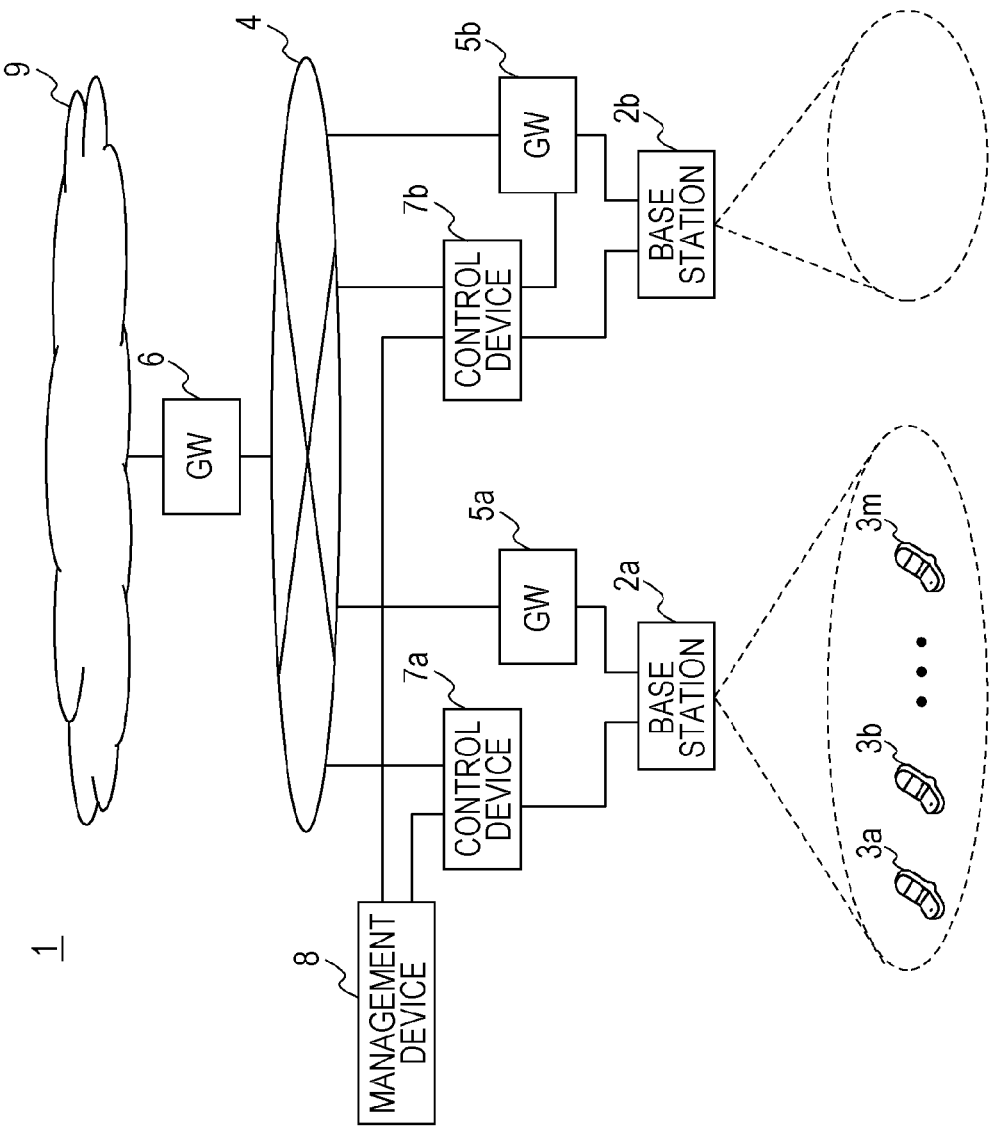
FIG. 1 is a diagram illustrating an example of a configuration of a communication system.

Hereinafter, embodiments are described with reference to the accompanying drawings. FIG. 1 is a diagram illustrating an example of a configuration of a communication system. A communication system 1 includes base station devices 2a and 2b, mobile station devices 3a, 3b, . . . , 3m, a first network 4, first gateway devices 5a and 5b, a second gateway device 6, control devices 7a and 7b, and a management device 8.

In the following description and the accompanying drawings, the gateway devices are referred to as "GWs" in some cases. The base station devices and the mobile station devices are referred to as "base stations" and "mobile stations" in some cases. The base station devices 2a and 2b are referred to as "base station(s) 2" in some cases. The mobile station devices 3a, 3b, . . . , 3m are referred to as "mobile station(s) 3" in some cases. The first GWs 5a and 5b are referred to as "first GW(s) 5" in some cases. The control devices 7a and 7b are referred to as "control device(s) 7" or "controller(s) 7" in some cases.

The base stations 2 form wireless communication zones in which the base stations 2 wirelessly communicate with the mobile stations 3 in accordance with predetermined wireless communication standards. The base stations 2 are constituent elements of radio access networks. The wireless communication standards may be third generation (3G) wireless communication standards defined by 3GPP, LTE, or the like. The communication system 1 described in this specification, however, is not limited to a communication system complying with the 3G wireless communication standards or LTE. The communication system 1 described in this specification is applicable to a mobile communication system that includes a control device for executing a call control process of controlling calls of mobile stations.

The first GWs 5 connect the radio access networks to the first network 4, while the second GW 6 connects the first network 4 to the second network 9. The first network 4 may be a private network of a telecommunications carrier for providing mobile communication services, for example. The first network 4 may be the Evolved Packet Core (EPC) standardized in LTE, for example. The first GWs 5 may be serving gateways (SGWs) installed in the EPC, and the second GW 6 may be a packet data network gateway (PGW) installed in the EPC, for example. The second network 9 may be the Internet or an Internet Protocol (IP) service network such as an intranet of a company, for example.

Radio bearers for transferring user packets are set between the mobile stations 3 and the base stations 2. First bearers for transferring user packets are set between the base stations 2 and the first GWs 5, while second bearers for transferring user packets are set between the first GWs 5 and the second GW 6.

In a state in which the radio bearers and the first bearers are not set, the mobile stations 3 transmit, through the base stations 2 to the control devices 7, connection request signals in order to connect the mobile stations 3 to the first network 4. The control devices 7 receive the connection request signals and control calls of the mobile stations 3. For example, the control devices 7 may be mobility management entities (MMEs) installed in the EPC, for example. The connection request signals may be service request messages defined in LTE, for example.

The control devices 7 that have received the connection request signals transmit, to the base stations 2, signals to instruct to set the radio bearers between the base stations 2 and the mobile stations 3. The base stations 2 and the mobile stations 3 establish the radio bearers in accordance with the signals to instruct to set the radio bearers. The signals to instruct to set the radio bearers may be Initial Context Setup Requests (SI-AP) defined in LTE, for example.

The control devices 7 transmit and receive, to and from the first GWs 5, bearer control signals to set or update the first bearers between the base stations 2 and the first GWs 5. The bearer control signals may be Modify Bearer Requests defined in LTE or Modify Bearer Responses defined in LTE.

The control devices 7 that have received the connection request signals transmit, to the management device 8, connection event notifications that inform the management device 8 that the control devices 7 have received the connection request signals from the mobile stations 3.

The management device 8 stores, for each of the mobile stations 3 based on the connection event notifications, history record information of times when the mobile stations 3 transmit the connection request signals. The management device 8 estimates, based on the history record information, whether or not the mobile stations 3 transmit the connection request signals at a target time after the current time. The management device 8 estimates, based on results of the estimations of whether or not the mobile stations 3 transmit the connection request signals at the target time, whether or not the transmission of the connection request signals is concentrated on the control devices 7 at the target time for each of the control devices 7.

If the management device 8 estimates that the transmission of connection request signals is concentrated on a control device 7, the management device 8 causes the control device 7 to control mobile stations 3 located in a cell covered by a base station 2 connected to the control device 7 so as to ensure that the mobile stations 3 transmit the connection request signals through the base station 2 to the control devices 7 before the target time. The mobile stations 3 to be controlled to transmit the connection request signals may be only mobile stations 3 estimated to transmit the connection request signals to the control device 7. In this case, the management device 8 may cause the control device 7 to control the multiple different mobile stations 3 at different times so as to ensure that the mobile stations 3 transmit the connection request signals.

The control for the mobile stations 3, of the transmission of the connection request signals may be executed to transmit, from the control devices 7 to the mobile stations 3, start signals to request the mobile stations 3 to start transmitting the connection request signals and executing a connection process. The start signals may be paging messages, for example.

The management device 8 may transmit, to the control devices 7, connection instruction signals to cause the control devices 7 to transmit the start signals. The management device 8 may transmit, at different times before the target time, the connection instruction signals to cause the control devices 7 to transmit the start signals to the multiple different mobile stations 3. In addition to or instead of this, each of the control devices 7 may transmit the start signals to the multiple different mobile stations 3 at different times before the target time in response to the reception of a single connection instruction signal.

The multiple different mobile stations 3 are connected to the first network 4 by the transmission of the connection instruction signals at the different times before the target time. Thus, the timing of transmitting the connection instruction signals before the target time is distributed. As a result, congestion occurred due to the call control process executed by the control devices 7 is suppressed.

Figure 2:
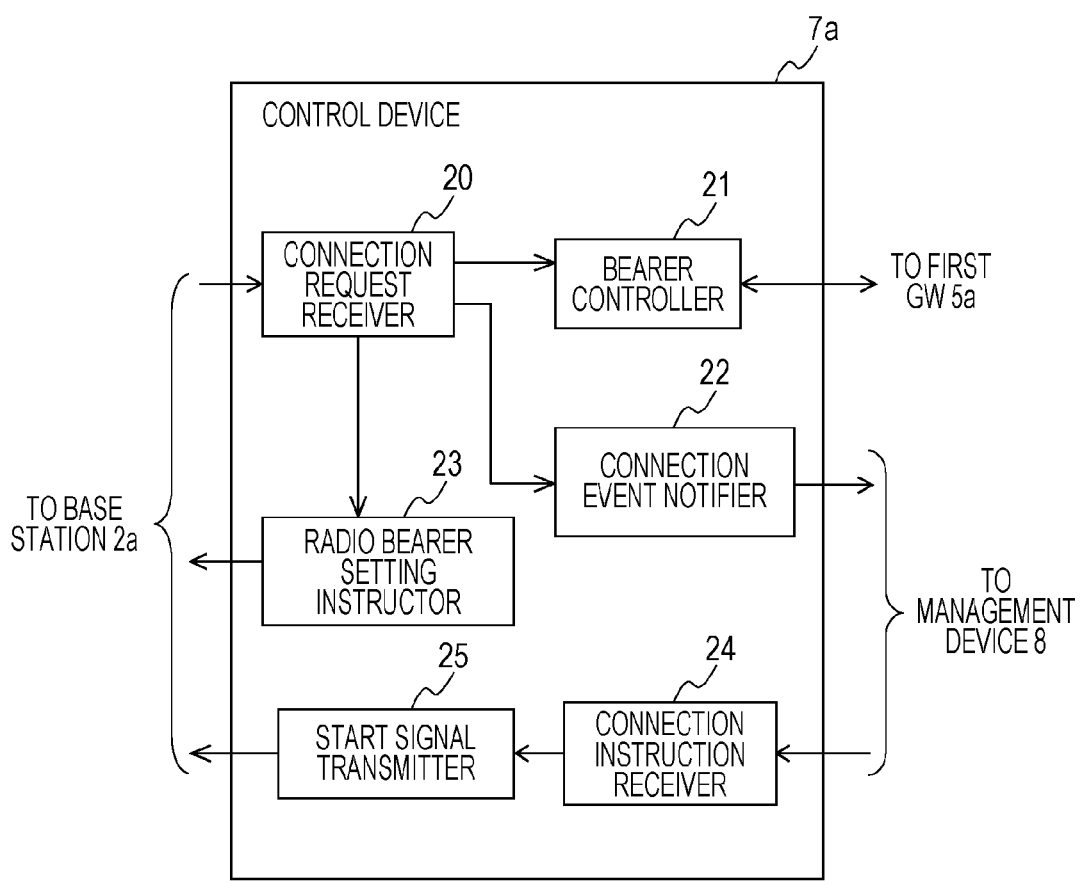
FIG. 2 is a diagram illustrating a first example of a functional configuration of a control device.

FIG. 2 is a diagram illustrating a first example of a functional configuration of the control device 7a. The control device 7b may have the same configuration as the control device 7a. The control device 7a includes a connection request receiver 20, a bearer controller 21, a connection event notifier 22, a radio bearer setting instructor 23, a connection instruction receiver 24, and a start signal transmitter 25.

The connection request receiver 20 receives a connection request signal from a mobile station 3. When the connection request receiver 20 receives the connection request signal from the mobile station 3, the bearer controller 21 transmits and receives a bearer control signal to and from the first GW 5 and sets or updates a first bearer for the mobile station 3. When the connection request receiver 20 receives the connection request signal, the radio bearer setting instructor 23 transmits, to the base station 2, a signal to instruct to set a radio bearer between the base station 2 and the mobile station 3.

When the connection request receiver 20 receives the connection request signal, the connection event notifier 22 transmits, to the management device 8, a connection event notification that informs the management device 8 that the connection request receiver 20 has received the connection request signal from the mobile station 3. The connection even notification may include information identifying the control device 7 and information identifying the mobile station 3 that has transmitted the connection request signal. The connection event notification may include or may not include a time when the connection request receiver 20 receives the connection request signal.

The connection instruction receiver 24 receives a connection instruction signal from the management device 8. The connection instruction signal may include information identifying a mobile station 3 to which a start signal is transmitted. The start signal transmitter 25 transmits the start signal to the mobile station 3 identified by the connection instruction signal.

The connection instruction signal may include information identifying multiple different mobile stations 3 to which start signals are transmitted. If the connection instruction signal includes information identifying the multiple different mobile stations 3, the start signal transmitter 25 may transmit the start signals to the identified multiple different mobile stations 3 at different times. Specifically, there is a difference between the times when the start signal transmitter 25 transmits the start signals to the multiple different mobile stations 3.

The connection instruction signal may include information to be used to determine the times when the start signal transmitter 25 transmits the start signals to the multiple different mobile stations 3. For example, the connection instruction signal may include information of the times when the start signal transmitter 25 transmits the start signals to the multiple different mobile stations 3. For example, the connection instruction signal may include information of a time period including the times when start signal transmitter 25 transmits the start signals to the multiple different mobile stations 3. For example, the connection instruction signal may include information identifying a time period from the time of the first transmission of the start signal to the time of the last transmission of the start signal.

The connection instruction signal may not include the information to be used to determine the times when the start signal transmitter 25 transmits the start signals. For example, the start signal transmitter 25 may transmit the start signals to the multiple different mobile stations 3 at different times of which intervals are equal to each other and that are within a second time period from a time when a first time period elapses after the reception of the connection instruction signal.

Figure 3:
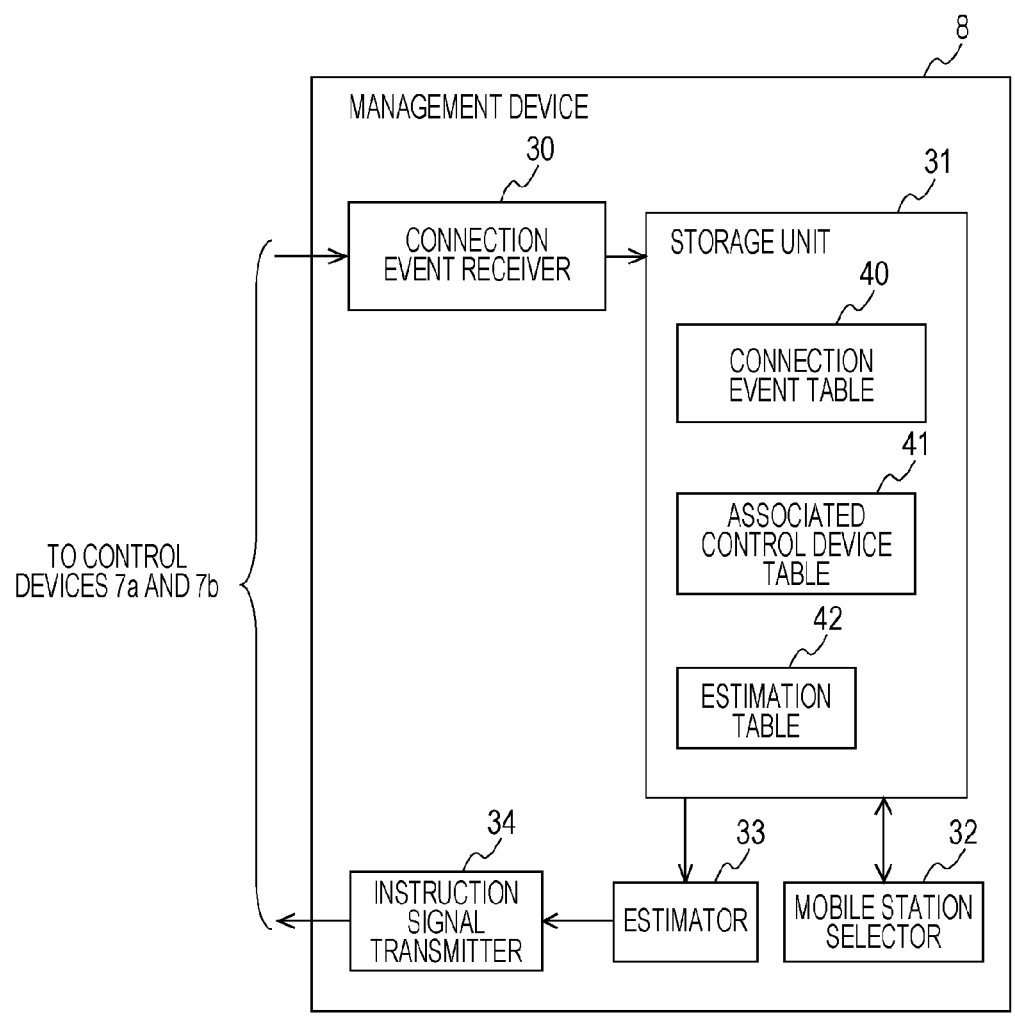
FIG. 3 is a diagram illustrating an example of a functional configuration of a management device.

FIG. 3 is a diagram illustrating an example of a functional configuration of the management device 8. The management device 8 includes a connection event receiver 30, a storage unit 31, a mobile station selector 32, an estimator 33, and an instruction signal transmitter 34.

The connection event receiver 30 receives connection event notifications from the control devices 7. The connection event receiver 30 causes, for each of mobile stations 3, history record information of a time when the mobile station 3 transmits a connection request signal to be stored in a connection event table 40. The connection event table 40 is stored in the storage unit 31.

FIG. 4 is a diagram illustrating an example of the connection event table 40. The connection event table 40 includes "time", "mobile station", and "control device" information items. The "time" information item represents a time when a mobile station 3 transmits a connection request signal. The "mobile station" information item represents an identifier of the mobile station 3 that transmits the connection request signal. The "control device" information item represents an identifier of a control device that transmits a connection event notification to the management device 8 in response to the reception of the connection request signal.

For example, an entry in a first row of the connection event table 40 illustrated in FIG. 4 represents that a mobile station 3 with an identifier "UE1" transmits a connection request signal to a control device 7 with an identifier "MME1" at "13:20:12".

If the connection event notification includes the time when the control device 7 receives the connection request signal, the connection event receiver 30 may cause the time of the reception of the connection request signal acquired from the connection event notification to be stored in the connection even table 40 as the time of the transmission of the connection request signal. If the connection event notification does not include the time when the control device 7 receives the connection request signal, the connection event receiver 30 may cause the time of the reception of the connection event notification by the management device 8 to be stored in the connection event table 40 as the time of the transmission of the connection request signal.

Refer to FIG. 3. The mobile station selector 32 references the connection event table 40 and selects, for each of the control devices 7, a mobile station 3 located in a cell covered by a base station 2 connected to the control device 7. In the following description and the accompanying drawings, a control device connected to a base station 2 covering a cell in which a mobile station 3 is located is referred to as an "associated control device" to the mobile station 3. In addition, a mobile station 3 located in a cell covered by a base station 2 connected to a control device 7 is referred to as an "associated mobile station" to the control device 7.

For example, the mobile station selector 32 selects, for each of the mobile stations 3, an entry including the latest time in the "time" information item from among entries stored in the connection event table 40 and identifies an associated control device to the mobile station 3 based on the "control device" information item of the selected entry.

The mobile station selector 32 causes information of associated control devices to mobile stations 3 to be stored in an associated control device table 41. The associated control device table 41 is stored in the storage unit 31.

FIG. 5 is a diagram illustrating an example of the associated control device table 41. The associated control device table 41 includes "mobile station" and "associated control device" information items. The "mobile station" information item represents identifiers of the mobile stations 3. The "associated control device" information item represents identifiers of the associated control devices. For example, an entry in a first row of the associated control device table 41 illustrated in FIG. 5 represents that an associated control device to the mobile station 3 with the identifier "UE1" is a control device 7 with an identifier "MME2". An entry in a second entry represents that an associated control device to a mobile station 3 with an identifier "UE2" is the control device 7 with the identifier "MME1".

Refer to FIG. 3. The estimator 33 estimates, for each of the mobile stations 3 based on the history record information stored in the connection event table 40, whether or not the mobile station 3 transmits a connection request signal at the target time after the current time. The estimator 33 may estimate, for each of the mobile stations 3 based on the periodicity of times when the mobile station device 3 transmits a connection request signal, whether or not the mobile station 3 transmits the connection request signal at the target time.

For example, the estimator 33 may estimate, based on whether or not the mobile station 3 transmits the connection request signal at multiple predetermined time intervals, the times when the mobile station 3 periodically transmit the connection request signal. For example, if each of the predetermined time intervals is one day, the estimator 33 may estimate that the mobile station 3 transmits the connection request signal at the same time on each day. For example, if each of the predetermined time intervals is one hour, the estimator 33 may estimate that the mobile station 3 transmits the connection request signal at 00 minutes of each hour.

The estimator 33 identifies, based on the associated control device table 41, associated mobile stations to each of the control devices 7. The estimator 33 calculates numbers Nu of mobile stations 3 that are among the associated mobile stations to each of the control devices 7 and estimated to transmit connection request signals at target times. The estimator 33 causes the calculated numbers Nu of mobiles stations estimated to transmit the connection request signals at the target times to be stored in an estimation table 42. The estimation table 42 is stored in the storage unit 31.

FIG. 6A is a diagram illustrating an example of the estimation table 42 storing numbers Nu of mobile stations 3 estimated to transmit connection request signals to the control device 7 with the identifier "MME1". FIG. 6B is a diagram illustrating an example of the estimation table 42 storing numbers Nu of mobile stations 3 estimated to transmit connection request signals to the control device 7 with the identifier "MME2". The estimation table 42 includes a "time" information item and a "number Nu of mobile stations" information item. The "time" information item represents predetermined time periods including the target times. The "number Nu of mobile stations" information item represents the numbers of mobiles stations estimated to transmit connection request signals to the control devices 7 within the time periods identified by the "time" information item.

For example, an entry in a first row of the estimation table 42 illustrated in FIG. 6A represents that the number Nu of mobile stations 3 estimated to transmit connection request signals to the control device 7 with the identifier "MME1" within a time period from 13:00:00 to 13:30:59 is 59. An entry in a second row of the estimation table 42 illustrated in FIG. 6B represents that the number Nu of mobile stations 3 estimated to transmit connection request signals to the control device 7 with the identifier "MME2" within a time period from 13:01:00 to 13:31:59 is 1376.

Refer to FIG. 3. The estimator 33 estimates, based on the numbers Nu of mobile stations 3 for each of the control devices 7, whether or not the transmission of connection request signals is concentrated on the control device 7. For example, if a number Nu of mobile stations 3 is larger than a threshold Th, the estimator 33 determines that the transmission of connection request signals is concentrated on an interested control device 7.

If the estimator 33 estimates that the transmission of connection request signals is concentrated on a control device 7, the instruction signal transmitter 34 may transmit, to the control device 7, a connection instruction signal to cause the control device 7 to transmit start signals to associated mobile stations to the control device 7. The instruction signal transmitter 34 may transmit, to the control device 7, a connection instruction signal to cause the control device 7 to transmit the start signal to only mobile stations 3 estimated by the estimator 33 to transmit connection request signals to the control device 7.

The instruction signal transmitter 34 may transmit, to a control device 7 at different times before the target time, connection instruction signals to cause the control device 7 to transmit start signals to multiple different associated mobile stations to the control device 7. Specifically, there is a difference between the times when the instruction signal transmitter 34 transmits the connection instruction signals before the target time and causes the control device 7 to transmit the start signals to the multiple different mobile stations. The connection instruction signals may include information identifying the mobile stations to which the start signals are transmitted.

The instruction signal transmitter 34 may cause an instruction to transmit start signals to the multiple different mobile stations to be included in a single connection instruction signal. The instruction signal transmitter 34 may transmit, to a control device 7, a connection instruction signal to cause the control device 7 to transmit start signals to different associated mobile stations to the control device 7 at different times within a certain time period before the target time. The connection instruction signal may include information identifying the multiple different associated mobile stations to which the start signals are transmitted.

FIG. 7 is a diagram illustrating an example of an operation of the management device 8. It is assumed that a number Nm of control devices 7 are controlled by connection instruction signals transmitted by the management device 8.

In operation AA, a variable i that identifies a control device 7 is set to "1". In operation AB, the mobile station selector 32 selects a mobile station 3 located in a cell covered by a base station 2 connected to a first control device 7.

In operation AC, the estimator 33 estimates a number Nu of mobile stations that transmit connection request signals at a target time when a predetermined time elapses after a current time. In operation AD, the estimator 33 determines whether or not the number Nu of the mobile stations exceeds the threshold Th. If the number Nu of the mobile stations exceeds the threshold Th (Yes in operation AD), the operation proceeds to operation AE. If the number Nu of the mobile stations does not exceed the threshold Th (No in operation AD), the operation proceeds to operation AF.

In operation AE, the instruction signal transmitter 34 transmits a connection instruction signal to the first control device 7 on which the transmission of the connection request signals is estimated to be concentrated. In operation AF, the variable i is incremented by 1. In operation AG, the estimator 33 determines whether or not the variable i exceeds the number Nm of the control devices 7. If the variable i does not exceed the number Nm of the control devices 7 (No in operation AG), the operation returns to operation AB. If the variable i exceeds the number Nm of the control devices 7 (Yes in operation AG), the operation is terminated.

FIG. 8 is a diagram illustrating a connection event notification operation. It is assumed that the mobile stations 3a, 3b, . . . , 3m are associated mobile stations to the control device 7a.

The mobile station 3a transmits a connection request signal through the base station 2a to the control device 7a, and the control device 7a receives the connection request signal in operation BA. Operation BA corresponds to an operation of the connection request receiver 20. In operation BB, the control device 7a transmits a connection event notification to the management device 8 in response to the reception of the connection request signal. Operation BB corresponds to an operation of the connection event notifier 22.

The mobile station 3b transmits a connection request signal through the base station 2a to the control device 7a, and the control device 7a receives the connection request signal in operation BC. Operation BC corresponds to an operation of the connection request receiver 20. In operation BD, the control device 7a transmits a connection event notification to the management device 8 in response to the reception of the connection request signal. Operation BD corresponds to an operation of the connection event notifier 22.

The mobile station 3m transmits a connection request signal through the base station 2a to the control device 7a, and the control device 7a receives the connection request signal in operation BE. Operation BE corresponds to an operation of the connection request receiver 20. In operation BF, the control device 7a transmits a connection event notification to the management device 8 in response to the reception of the connection request signal. Operation BF corresponds to an operation of the connection event notifier 22.

Operations BG and BH are the same as operations BC and BD. Operations BI and BJ are the same as operations BE and BF. Operations BK and BL are the same as operations BA and BB. History record information of times when the mobile stations 3 transmit the connection request signals is stored in the connection event table 40 for the mobile stations 3 in response to the reception of the connection event notifications.

FIGS. 9 and 10 are diagrams illustrating an example of an operation for instructions for connections. In operation CA, the management device 8 estimates a number Nu of mobile stations that transmit connection request signals at a target time after a current time. In operation CB, the management device 8 estimates whether or not the transmission of the connection request signals is concentrated on the control device 7a. Operations CA and CB correspond to operations of the estimator 33.

If the management device 8 estimates that the transmission of the connection request signals is concentrated on the control device 7a, the management device 8 transmits a connection instruction signal to the control device 7a. In operation CC, the management device 8 transmits, to the control device 7a, a connection instruction signal to cause the control device 7a to transmit a start signal to the mobile station 3a. Operation CC corresponds to an operation of the instruction signal transmitter 34.

In operation CD, the control device 7a transmits the start signal to the mobile station 3a through the base station 2a. Operation CD corresponds to an operation of the start signal transmitter 25. When the mobile station 3a transmits a connection request signal through the base station 2a to the control device 7a, the control device 7a receives the connection request signal in operation CE. Operation CE corresponds to an operation of the connection request receiver 20.

In operation CE, the control device 7a transmits, to the base station 2a, a radio bearer setting instruction signal to instruct to set a radio bearer between the mobile station 3a and the base station 2a. Operation CF corresponds to an operation of the radio bearer setting instructor 23. In operation CG, the mobile station 3a and the base station 2a set the radio bearer. In operation CH, the control device 7a transmits and receives a bearer control signal to and from the first GW 5 and establishes a first bearer for transferring a user packet of the mobile station 3a. Operation CH corresponds to an operation of the bearer controller 21.

In operation CI, the management device 8 transmits, to the control device 7a, a connection instruction signal to cause the control device 7a to transmit a start signal to the mobile station 3b. Operation CI corresponds to an operation of the instruction signal transmitter 34.

In operation CJ, the control device 7a transmits the start signal to the mobile station 3b through the base station 2a. Operation CJ corresponds to an operation of the start signal transmitter 25. When the mobile station 3b transmits a connection request signal to the control device 7a through the base station 2a, the control device 7a receives the connection request signal in operation CK. Operation CK corresponds to an operation of the connection request receiver 20.

In operation CL, the control device 7a transmits, to the base station 2a, a radio bearer setting instruction signal to instruct to set a radio bearer between the mobile station 3b and the base station 2a. Operation CL corresponds to an operation of the radio bearer setting instructor 23. In operation CM, the mobile station 3b and the base station 2b set the radio bearer. In operation CN, the control device 7a transmits and receives a bearer control signal to and from the first GW 5 and establishes a first bearer for transferring a user packet of the mobile station 3b. Operation CN corresponds to an operation of the bearer controller 21.

In operation CO, the management device 8 transmits, to the control device 7a, a connection instruction signal to cause the control device 7a to transmit a start signal to the mobile station 3m. Operation CO corresponds to an operation of the instruction signal transmitter 34.

In operation CP, the control device 7a transmits the start signal through the base station 2a to the mobile station 3m. Operation CP corresponds to an operation of the start signal transmitter 25. When the mobile station 3m transmits a connection request signal to the control device 7a through the base station 2a, the control device 7a receives the connection request signal in operation CQ. Operation CQ corresponds to an operation of the connection request receiver 20.

In operation CR, the control device 7a transmits, to the base station 2a, a radio bearer setting instruction signal to instruct to set a radio bearer between the mobile station 3m and the base station 2a. Operation CR corresponds to an operation of the radio bearer setting instructor 23. In operation CS, the mobile station 3m and the base station 2a set the radio bearer. In operation CT, the control device 7a transmits and receives a bearer control signal to and from the first GW 5 and establishes a first bearer for transferring a user packet of the mobile station 3m. Operation CT corresponds to an operation of the bearer controller 21.

The management device 8 may distribute the timing of transmitting the connection instruction signals in operations CC, CI, and CO so as to ensure that the operations, executed by the control device 7a, of instructing the setting of the radio bearers and the operations, executed by the control device 7a, of instructing the setting of the first bearers are not concentrated in a certain time period. Specifically, the management device 8 may transmit the connection instruction signals in operations CC, CI, and CO so as to ensure that there are differences between the times when the connection instruction signals are transmitted.

When the current time reaches the target time represented by an arrow 70, the mobile stations 3a, 3b, . . . , 3m each start transmitting a user packet. Since the bearers are already established between the mobile stations 3a, 3b, . . . , 3m and the first GW 5, the mobile stations 3a, 3b, . . . , 3m do not transmit a connection request signal to the control device 7a at the target time.

In operation CU, the mobile station 3a transmits a user packet through the radio bearer between the mobile station 3a and the base station 2a and the first bearer for the mobile station 3a. In operation CV, the mobile station 3b transmits a user packet through the radio bearer between the mobile station 3b and the base station 2a and the first bearer for the mobile station 3b. In operation CW, the mobile station 3m transmits a user packet through the radio bearer between the mobile station 3m and the base station 2a and the first bearer for the mobile station 3m.

According to the embodiment, the timing of transmitting the connection request signals may be distributed into an arbitrary time period before the target time, although the transmission of the connection request signals is estimated to be concentrated at the target time. As a result, congestion occurred due to the call control process executed by the control devices 7 may be suppressed.

For example, if communication is not executed for a time period of 5 minutes or more and mobile stations 3 release radio bearers, the management device 8 may distribute the timing of transmitting connection request signals into a time period of 5 minutes before the target time. For example, if the timing of transmitting the connection request signals is distributed into the time period of minutes without being distributed into a time period of 1 second, a load applied to the control devices 7 per unit of time due to the call control process is reduced to 1/300.

Second Embodiment

The control device 7a according to a second embodiment includes the connection event table 40 and estimates that the transmission of connection request signals is concentrated on the control device 7a. History record information of a time when a connection request signal is transmitted to the other control device 7b is stored in the connection event table 40. Thus, when receiving the connection request signal, the control device 7b transmits a connection event notification to the control device 7a. Similarly, when receiving a connection request signal, the control device 7a transmits a connection event notification to the control device 7b. The management device 8 may be omitted in the second embodiment.

Figure 11:
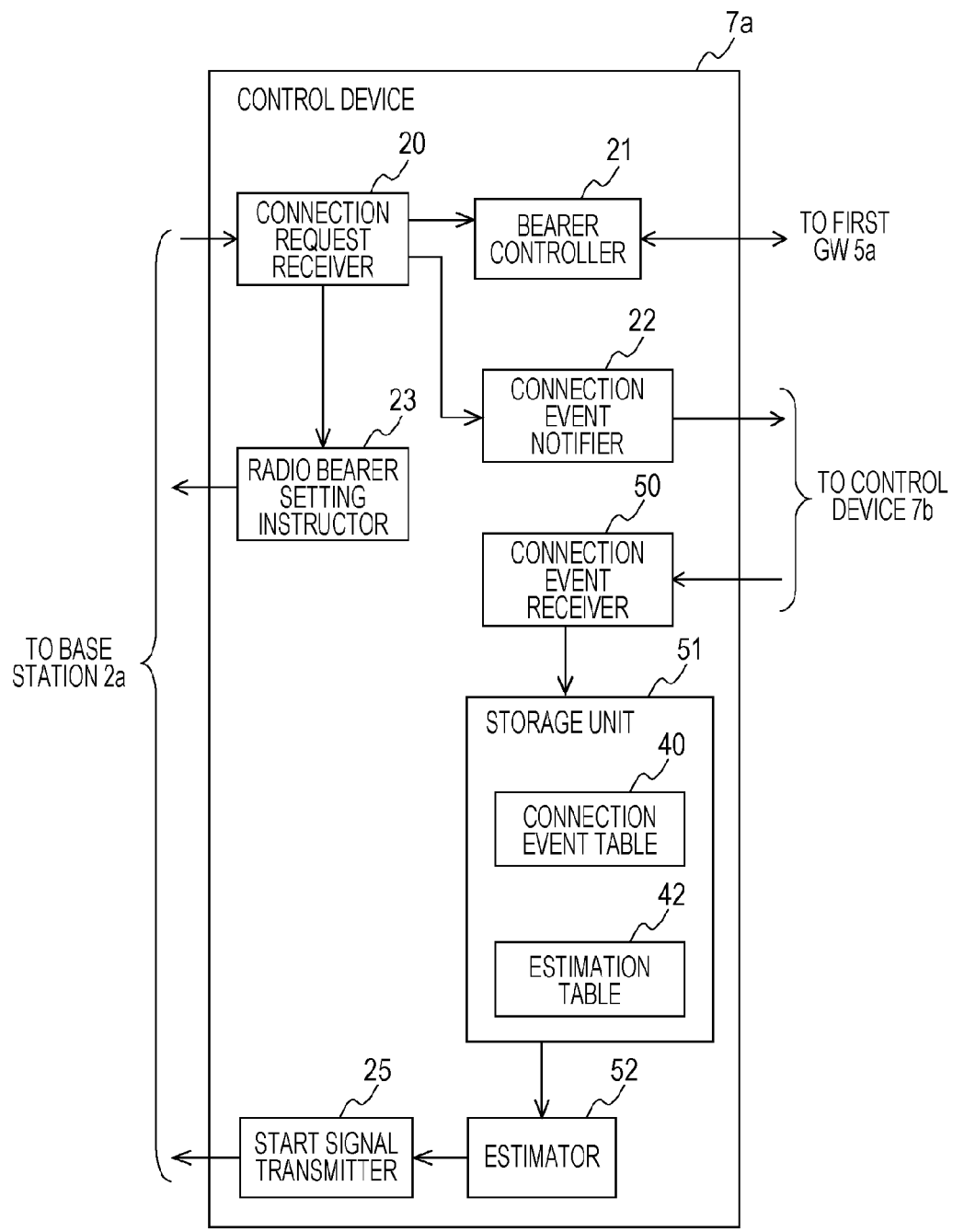
FIG. 11 is a diagram illustrating a second example of the functional configuration of the control device.

FIG. 11 is a diagram illustrating a second example of the functional configuration of the control device 7a. The control device 7b may have the same configuration as the control device 7a. Constituent elements that are illustrated in FIG. 11 and are the same as the constituent elements illustrated in FIG. 2 are represented by the same reference numerals as those illustrated in FIG. 2.

The control device 7a includes a connection event receiver 50, a storage unit 51, and an estimator 52. When the connection request receiver 20 receives a connection request signal, the connection event notifier 22 transmits a connection event notification to the other control device 7b. The connection event receiver 50 receives a connection event notification transmitted by the other control device 7b. The control devices 7a and 7b may each transmit a connection event notification through the first network 4 to the other control device, for example.

The control device 7a stores, in the connection event table 40 for each of the mobile stations 3, history record information of a time when the mobile station 3 transmits a connection request signal. The connection event table 40 is stored in the storage unit 51.

The estimator 52 estimates, based on the history record information stored in the connection event table 40, whether or not each of associated mobile stations to the control device 7a transmits a connection request signal at the target time after the current time. The estimator 33 calculates a number Nu of mobile stations that are among the associated mobile stations to the control device 7a and estimated to transmit a connection request signal at the target time.

The estimator 52 causes numbers Nu of the mobile stations 3 that transmit connection request signals at times to be stored in the estimation table 42. The estimation table 42 is stored in the storage unit 51. The estimator 52 estimates, based on the numbers Nu of mobile stations 3, whether or not the transmission of connection request signals is concentrated on the control device 7a.

If the estimator 52 estimates that the transmission of the connection request signals is concentrated on the control device 7a, the start signal transmitter 25 transmits start signals to the associated mobile stations 3 to the control device 7a. The start signal transmitter 25 may transmit a start signal to only a mobile station 3 estimated to transmit a connection request signal at the target time. The start signal transmitter 25 may transmit the start signals to the multiple different associated mobile stations at different times before the target time.

In the second embodiment, the timing of transmitting the connection request signals may be distributed into an arbitrary time period before the target time, although the transmission of the connection request signals is estimated to be concentrated at the target time. As a result, congestion occurred due to the call control process executed by the control devices 7 may be suppressed.

FIGS. 2, 3, and 11 mainly illustrate the configurations related to the functions of the control devices 7a described in this specification and the functions of the management device 8 described in this specification. The control device 7a and the management device 8 may include another constituent element other than the constituent elements illustrated in FIGS. 2, 3, and 11. The operations described with reference to FIGS. 7 to 10 may be each interpreted as a method including a plurality of procedures.

Hardware Configuration

Figure 12:
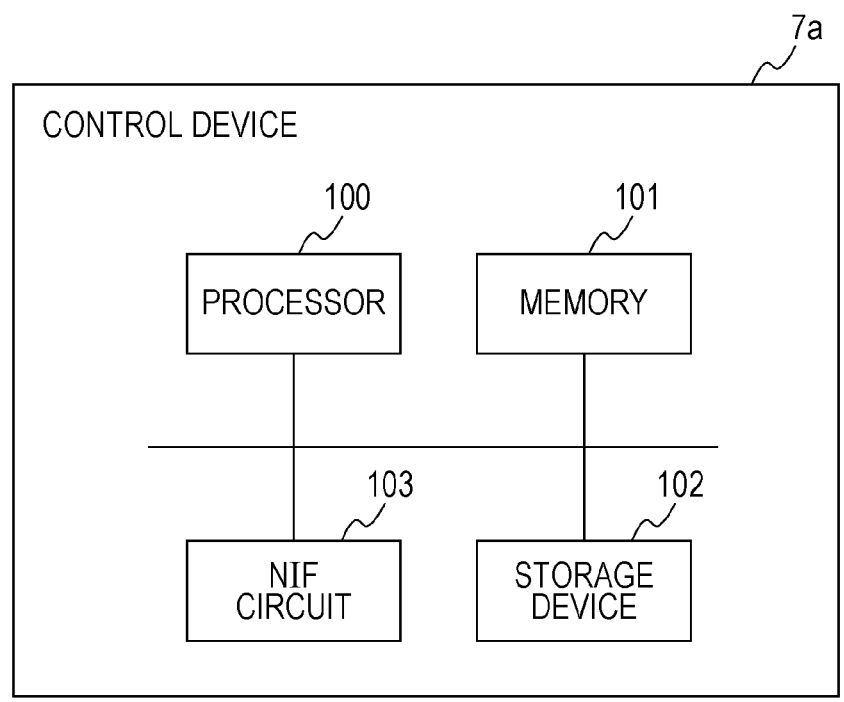
FIG. 12 is a diagram illustrating an example of a hardware configuration of the control device.

FIG. 12 is a diagram illustrating an example of a hardware configuration of the control device 7a. The control device 7a may be an information processing device that includes a processor 100, a memory 101, a storage device 102, and a network interface circuit 103. In the following description and FIGS. 12 and 13, a network interface circuit is referred to as an "NIF circuit" in some cases.

The processor 100 executes the aforementioned processes of the control devices 7a by executing a computer program stored in the storage device 102. The computer program to be executed by the processor 100 and data to be used for the execution of the computer program are stored in the storage device 102. The storage device 102 may include a nonvolatile memory, a read only memory (ROM), and a hard disk as storage elements.

The program that is currently executed by the processor 100 and data that is temporarily used during the execution of the program are stored in the memory 101. The memory 101 may include a random access memory. The NIF circuit 103 is a communication interface circuit for communicating with the management device 8 and the first network 4 through communication lines.

The aforementioned operations of the connection request receiver 20, the bearer controller 21, the connection event notifier 22, the radio bearer setting instructor 23, the connection instruction receiver 24, the start signal transmitter 25, and the connection event receiver 50 are executed by causing the processor 100 and the NIF circuit 103 to collaborate with each other. The aforementioned operations of the estimator 33 are executed by the processor 100. The connection event table 40 and the estimation table 42 are stored in the storage device 102.

Figure 13:
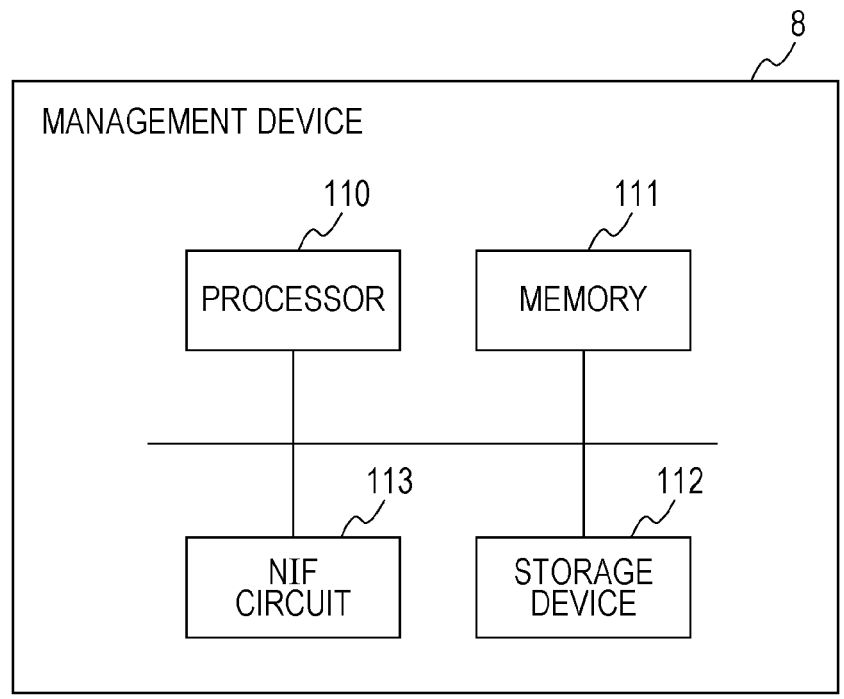
FIG. 13 is a diagram illustrating an example of a hardware configuration of the management device.

FIG. 13 is a diagram illustrating an example of a hardware configuration of the management device 8. The management device 8 may be an information processing device that includes a processor 110, a memory 111, a storage device 112, and an NIF circuit 113.

The processor 110 executes the aforementioned processes of the management device 8 by executing a computer program stored in the storage device 112. The computer program to be executed by the processor 110 and data to be used for the execution of the computer program are stored in the storage device 112. The storage device 112 may include a nonvolatile memory, a read only memory, and a hard disk as storage elements.

The program that is currently executed by the processor 110 and data that is temporarily used during the execution of the program are stored in the memory 111. The memory 111 may include a random access memory. The NIF circuit 113 is a communication interface circuit for communicating with the control devices 7 through communication lines.

The aforementioned operations of the connection event receiver 30 and the instruction signal transmitter 34 are executed by causing the processor 110 and the NIF circuit 113 to collaborate with each other. The aforementioned operations of the mobile station selector 32 and the estimator 33 are executed by the processor 110. The connection event table 40, the associated control device table 41, and the estimation table 42 are stored in the storage device 112.

The hardware configurations illustrated in FIGS. 12 and 13 are examples of hardware configurations that achieve the control device 7a and the management device 8. Other hardware configurations may be used for the control device 7a and the management device 8 as long as the aforementioned operations are executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
   at least one processor; and
   a memory which stores a plurality of instructions, which when executed by the at least one processor, cause the at least one processor to execute:
   estimating whether or not at least two of a plurality of mobile station devices request a wireless connection at a target time after a current time; and
   instructing a control device, configured to control calls of the mobile station devices, to execute a process of causing a first mobile station device of the plurality of mobile station devices to request the wireless connection at a first time before the target time and causing a second mobile station device of the plurality of mobile station devices that is different from the first mobile station device to request the wireless connection at a second time that is before the target time and different from the first time, when the number of mobile station devices that are estimated to request the wireless connection to the control device at the target time exceeds a predetermined value, wherein
   the estimated request of the at least two of the plurality of mobile station devices at the target time is after the current time, the first time, and the second time,
   the request at the second time is after the first time and the current time, but before the target time,
   the request at the first time is after the current time, but before the second time and the target time, and
   the current time is before the target time, the second time, and the first time.

2. The management device according to claim 1, wherein the estimating estimates whether or not a target mobile station device located in a cell formed by a base station device connected to a first control device serving as the control device requests the wireless connection, based on a history record representing that the target mobile station device has requested the wireless connection to the first control device and a history record representing that the target mobile station device has requested the wireless connection to a second control device configured to control calls of the mobile station devices and different from the first control device.

3. The management device according to claim 1, wherein the instructing instructs the control device to execute a process of causing only a mobile station device, estimated to request the wireless connection to the control device, to request the wireless connection.

4. The management device according to claim 1, wherein the at least one processor further executes transmitting, to the control device at a third time before the first time, an instruction signal to instruct the first mobile station device to request the wireless connection and transmitting, to the control device at a fourth time before the second time, an instruction signal to instruct the second mobile station device to request the wireless connection.

5. A control device configured to control calls of mobile station devices, comprising:
   at least one processor; and
   a memory which stores a plurality of instructions, which when executed by the at least one processor, cause the at least one processor to execute:
   notifying, based on history records of requests for wireless connections from the mobile station devices, a management device, configured to estimate whether or not the mobile station devices request the wireless connections to the control device at a target time after a current time, that the mobile station devices have requested the wireless connections;
   receiving, from the management device, an instruction signal that has been transmitted when the number of mobile station devices estimated to request wireless connections to the control device at the target time exceeds a predetermined value and that causes the control device to execute a process of causing the mobile station devices to request the wireless connections after the current time and before the target time;
   causing the mobile station devices to request the wireless connections after the current time and before the target time in response to the reception of the instruction signal;

estimating whether or not the mobile station devices each request the wireless connection at the target time; and causing a first mobile station device to request the wireless connection at a first time before the target time and cause a second mobile station device that is different from the first mobile station device to request the wireless connection at a second time that is before the target time and different from the first time, in a case where the number of mobile station devices that are each estimated to request the wireless connection to the control device at the target time exceeds a predetermined value, wherein the request at the second time is after the first time and the current time, but before the target time, and the request at the first time is after the current time, but before the second time and the target time.

6. The control device according to claim 5, wherein the at least one processor further executes:

receiving a request signal for the wireless connection from a third mobile station device; and receiving, from a second control device configured to control calls of the mobile station devices and different from a first control device serving as the control device, a notification representing that a fourth mobile station device has requested the wireless connection to the second control device, wherein the estimating estimates, based on a first history record representing that a target mobile station device located in a cell formed by a base station device connected to the first control device has requested the wireless connection to the first control device and a second history record representing that the target mobile station device has requested the wireless connection to the second control device, whether or not the target mobile station device requests the wireless connection.

7. A communication method comprising:

estimating whether or not mobile station devices each request a wireless connection at a target time after a current time; and instructing a control device, configured to control calls of the mobile station devices, to execute a process of causing a first mobile station device to request the wireless connection at a first time before the target time and causing a second mobile station device that is different from the first mobile station device to request the wireless connection at a second time that is before the target time and different from the first time, in a case where the number of mobile station devices that are each estimated to request the wireless connection to the control device at the target time exceeds a predetermined value, wherein the estimated request of the mobile station devices at the target time is after the current time, the first time, and the second time, the request at the second time is after the first time and the current time, but before the current time, the request at the first time is after the current time, but before the second time and the target time, and the current time is before the target time, the second time, and the first time.

* * * * *